A. B. SHAW.
Sewing Machine.
No. 1,625.
Reissued Feb. 23, 1864.
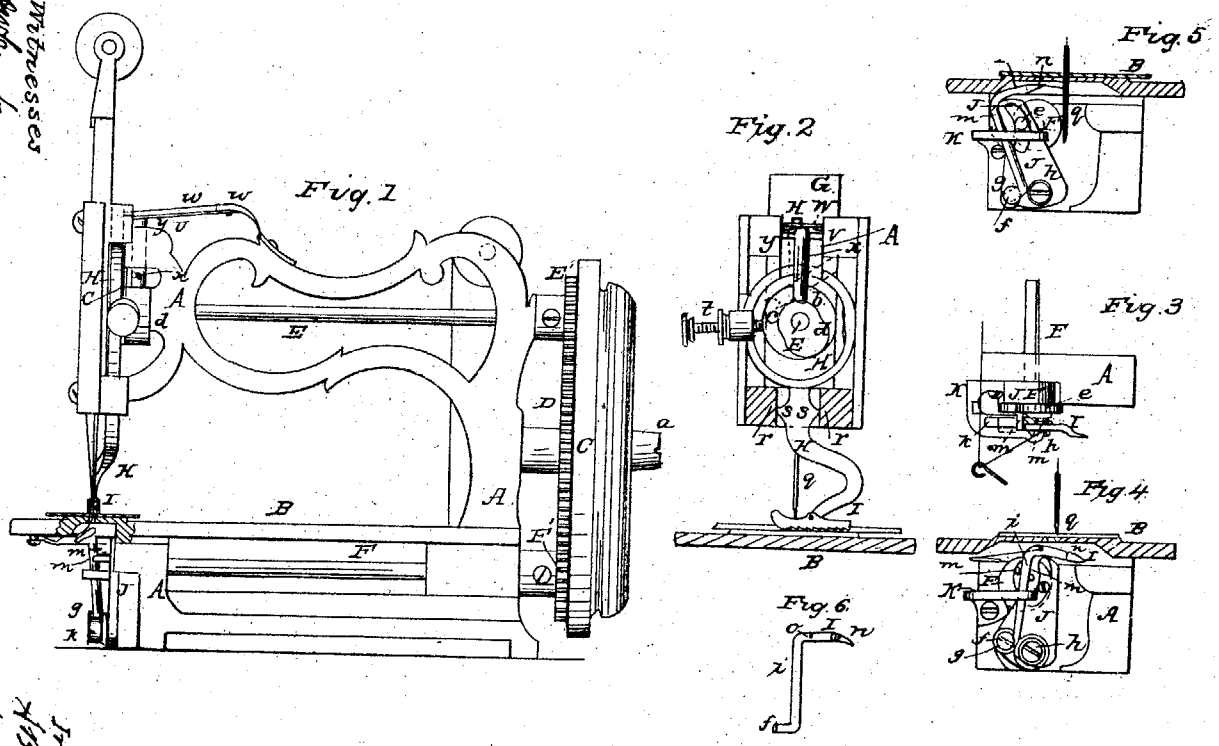
Witnesses
J. W. Coombs
J. W. Reed
Inventor
A. B. Shaw
per Munn & Co
Attorneys

UNITED STATES PATENT OFFICE.

A. B. SHAW AND N. H. SHAW, OF SWANTON, VT., ASSIGNEES OF A. B. SHAW.

IMPROVEMENT IN SEWING-MACHINES.

Specification forming part of Letters Patent No. 37,202, dated December 16, 1862; Reissue No. 1,625, dated February 23, 1864.

*To all whom it may concern:*

Be it known that we, A. B. SHAW and N. H. SHAW, late of the city and county of Worcester, State of Massachusetts, now of Swanton, in the county of Franklin and State of Vermont, did obtain, as assignees of A. B. SHAW aforesaid, Letters Patent for a new and useful Improvement in Sewing-Machines; and we do hereby declare that the following is a full, clear, and exact description of the same, reference being had to the accompanying drawings, forming part of this specification, in which—

Figure 1 is a front view of a sewing-machine. Fig. 2 is a vertical section at right angles to Fig. 1, exhibiting the mechanism for holding down and feeding the cloth or other material to be sewed. Fig. 3 is a top view of the looper and its operating mechanism. Fig. 4 is a side view, corresponding with Fig. 3. Fig. 5 is a view similar to Fig. 4, but showing the parts in a different position. Fig. 6 is a side view of the looper.

Similar letters of reference indicate corresponding parts in the several figures.

This invention relates to what is known in sewing-machines as the "top feed," in which the presser and feeder are combined in one foot-piece, working on the top of the cloth; and it consists in a certain novel means of relieving the cloth of the pressure of the foot-piece while the latter is returning to take a new hold of the cloth after every feeding movement and preparatory to the repetition of such movement.

The invention is applicable to sewing-machines for making various kinds of stitches. The machine represented is one for making what is known as the "double-looped stitch."

A is the stand or frame of the machine, and B is the work-bed, bolted to the lower part of the stand A. C is the driving-wheel, arranged to rotate upon a fixed stud, *a*, at the opposite end of the machine to where the needle is actuated, and carrying a gear, D, which gears with a spur-gear, E′, on the needle-operating and feed-operating shaft E, and with a spur-gear, F′, on the looper-operating shaft F, the said shafts being arranged parallel with each other, the latter in bearings under the work-plate and at the back of the machine, and the former in bearings in the upper part of the framing. The shaft E carries a crank or eccentric wrist, *b*, for operating the needle-bar G, a cam, *c*, for operating the feed-lever H, and a cam, *d*, for taking the pressure off the feeding and pressing foot piece. The shaft F carries a crank or eccentric wrist, *e*, for producing the operation of the curved looper I. The looper I is attached to or made in the same piece with an arm, *i*, at the bottom of which is formed a pivot, *f*, which is received in a bearing in a stud, *g*, which is firmly secured in a slotted rocker, J, which rocks on a fixed horizontal pin, *h*, secured in the lower part of that end of the stand A next the needle. The said looper has two movements—viz., a longitudinal one, produced by the movement of the rocker J above mentioned, and a lateral one, produced by the vibration of the arm *i* from the above-mentioned vibration of the pivot *f*. The above-mentioned lateral vibration of the arm *i* is produced by its being carried in its movement with the rocker back and forth through the curved slot *k*, provided in a stationary plate, K, (shown best in Fig. 3,) secured to the stand A. The vibrating movement of the rocker J is produced by the revolution of the crank or eccentric wrist-pin *e*, before mentioned, in the slot *j*, provided in the said rocker for its reception, the slot being so formed and the wrist *e* so arranged as to properly time the movements of the looper relatively to those of the needle. To prevent any strain of the pivot *f* or stud *g* being produced in the working of the looper, two steadying-pins, *m m*, are provided in the rocker J for the arm *i* to work between. The looper has two eyes, *n o*, for the passage of the thread, and a groove between these eyes on the side farthest from the needle. The operation of the looper relatively to the needle *q* in making the stitch is substantially the same as in some other sewing-machines for making the double-looped stitch, and needs no particular description.

The feed-lever H, carrying the jointed feeding and pressing foot L, is fitted into a vertical slot, *r r*, in the stand A, the part received in the said slot having rounded protuberances *s s* on each side to bear against the sides of the said slot in such a manner as to permit the free vibration of the lever, as well as a free upward and downward movement thereof. The said lever is made with a yoke, H′, for the reception of the cam *c*, and fitted with a set-screw, *t*, to regulate the feed, as in many other sewing machines. The downward pressure upon the said lever is produced by a spring, which is represented as made in two leaves, *u* and *v*, of which the upper leaf, *u*, is secured firmly to the top of the stand, and the lower leaf, *v*, is attached to the upper one, *u*, by a rivet, *w*, or other means, in such manner as to permit it to have an independent upward and downward movement. The upper leaf, *u*, does not touch the lever H, but the end of the lower one, *v*, enters a transverse notch in the said lever. Between the spring and the cam *d* there is arranged a pin, *x*, which is fitted to slide vertically in a guide in the standard A, and a hole, *y*, is provided on the lower leaf of the spring for the said pin to pass freely through. While the needle is in the cloth and the lever is returning with the foot L preparatory to a new feed movement, the cam, by its action through the pin *x* on the upper leaf of the spring, raises the said leaf, and so removes the pressure of the spring from the lever and foot, allowing the latter to slide freely over the cloth, the lower leaf of the spring then hanging loose below the upper one; but before the needle is drawn out of the cloth the cam passes round far enough to let the upper leaf of the spring descend, and the two leaves of the spring then combine to press upon the lever and foot, and continue to do so until the needle has again entered the cloth, when the cam again raises the upper leaf.

It is not necessary to make the spring of two leaves, as above described, and represented in the drawings. The only advantage obtained by making it of two leaves over making it of a single leaf is that it enables the machine to run more quietly.

We do not claim broadly taking the pressure off the foot or pressure-pad of a sewing-machine while the needle is in the cloth; but

What we claim as the invention of A. B. SHAW, and desire to secure by Letters Patent, is—

The combination of the lifting-cam and pin *x* with the feed-lever and a spring applied to the said lever, to operate substantially as and for the purpose herein specified.

A. B. SHAW.
N. H. SHAW.

Witnesses:
N. F. FERRIS,
C. E. FERRIS.